(12) United States Patent
Richter (10) Patent No.: US 8,410,662 B2
(45) Date of Patent: Apr. 2, 2013

(54) ELECTRIC UNIVERSAL DRIVE

(76) Inventor: Hans Richter, Augsburg (DE)

( * ) Notice: Subject to any disclaimer, the term of this patent is extended or adjusted under 35 U.S.C. 154(b) by 77 days.

(21) Appl. No.: 13/068,203

(22) Filed: May 5, 2011

(65) Prior Publication Data
US 2011/0210647 A1    Sep. 1, 2011

Related U.S. Application Data

(63) Continuation-in-part of application No. PCT/DE2009/001536, filed on Nov. 4, 2009.

(30) Foreign Application Priority Data

Nov. 10, 2008  (DE) .......................... 10 2008 056 570
Dec. 2, 2008   (DE) .......................... 10 2008 059 890

(51) Int. Cl.
   *H01L 41/08* (2006.01)
(52) U.S. Cl. .................................. 310/323.02; 310/328
(58) Field of Classification Search ............. 310/323.02, 310/328
   See application file for complete search history.

(56) References Cited

U.S. PATENT DOCUMENTS

| | | | | |
|---|---|---|---|---|
| 4,455,501 A | * | 6/1984 | Tojo et al. ..................... | 310/328 |
| 4,585,969 A | * | 4/1986 | Tanaka .......................... | 310/328 |
| 4,736,131 A | * | 4/1988 | Fujimoto ...................... | 310/328 |
| 5,900,691 A | * | 5/1999 | Reuter et al. ................. | 310/348 |
| 7,521,839 B2 | * | 4/2009 | Mori ......................... | 310/323.02 |
| 8,004,149 B2 | * | 8/2011 | Blume et al. ............. | 310/323.02 |
| 2010/0295418 A1 | * | 11/2010 | Blume et al. ............. | 310/323.02 |

* cited by examiner

*Primary Examiner* — Mark Budd
(74) *Attorney, Agent, or Firm* — Klaus J. Bach (57) ABSTRACT

In a universal drive with a rotatable or linearly movable drive member and piezo actuators supported on a carrier for acting on a leg supported on the drive member and moving the leg in a high-frequency stepping sequence in a drive direction, wherein the carriers are jointly supported on a stator by a pretension member which biases them elastically toward the drive member via an elbow lever mechanism including a first elbow lever and at least a second elbow lever which are both connected to an actuator by a coupling member and this arrangement is such that, with the first elbow lever stretched, the second elbow lever is kinked and vice versa.

15 Claims, 5 Drawing Sheets

ELECTRIC UNIVERSAL DRIVE

This is a Continuation-In-Part application of pending international patent application PCT/DE2009/001536 filed Nov. 4, 2009 and claiming the priority of German patent applications 10/2008056570.9 filed Nov. 10, 2008 and 10 2008 059890.9 filed Dec. 2, 2008.

BACKGROUND OF THE INVENTION

The invention resides in an electric universal drive based on a piezo motor which is particularly designed for use as a vehicle drive but may also be used for various other drive applications. It is described below in the form of a piezo motor universal drive. But the piezo actuators may be replaced by equally or similarly effective high-frequency actuators.

As vehicle drives, in particular of motor vehicles, the drive according to the invention may be effective via a drive element in the form of a disc coupled to a wheel shaft. In a motor vehicle for example, a brake disc may be used as the disc cooperating with the drive according to the invention which disc then is a drive disc as well as a brake disc.

U.S. Pat. No. 7,638,329 discloses a piezoelectric motor for use as a vehicle drive, a control drive or similar. It includes two motors arranged in a mirror-reversed manner at opposite sides of a drive or braking disc. The motors are arranged each between a reference part, that is, a frame or housing and the drive or braking disc forming the driven part.

The motor includes alternately electrically energized clamping piezo packets and two oppositely disposed stepping piezo packets assigned to each clamping piezo packet, which are arranged in longitudinally-spaced relationship from the clamping packet and the driven part and are connected to a leg which is quasi-linked to the clamping piezo packet and which acts on the driven part.

The clamping piezo packets serve in each case for the selective generation of a clamping force between the reference and the driven part which is the reason that they are called clamping piezo packets. These clamping piezo packet are in each case connected with one end of the piezo element stack arrangement to the reference part and are supported at the other end via the leg on the driven or drive part without being connected thereto. The clamping piezo packets are arranged each side-by-side in rows wherein the orientation of the row is transverse to the relative movement between the driven part and the reference part.

Each of the two mirror-reversed arranged drive arrangements has two groups of clamping piezo packets and two groups of stepping piezo packets. They are electrically so controlled that, while the one group of clamping piezo packets is activated, that is, electrically energized for an expansion thereof, and these clamping packets engage via the leg connected thereto the driven part, the other of the group of clamping packets is de-activated that is it is in the release position, in which it is not in engagement with the driven part. Then the group of stepping piezo packets assigned to the energized clamping piezo packets is activated so that the respective stepping piezo packets expand and, in this way, displace by a certain distance the legs of the clamping piezo packets in engagement with the driven part. As a result, the driven part is moved by a corresponding distance past the clamping piezo packets of the other clamping piezo packet group which is in the release position. Subsequently, the control is switched over, that is, the previously clamping piezo packets are switched to a release position together with the associated stepping piezo packets, so that the previously clamping piezo packets are freed from the clamping position and return to their rest position while, at the same time, the other group of clamping piezo packets which previously were in the release position are energized that is switched to their clamping position whereupon also their stepping piezo packets are activated. In this way, the two groups of clamping piezo packets with the respective associated stepping piezo packets provide for a continuous stepping sequence by their alternating energization whereby the driven part is moved in a stepwise fashion. Since this control of the piezo packets occurs in the frequency range of several kilohertz, for example 25 kHz, a given continuous movement of the driven part relative to the reference part is obtained.

For the cooperation between the clamping piezo packets and the driven part to function, the clamping piezo packets between the reference part and the driven part must be held under tight pretension since otherwise, with the available expansion stroke of the clamping piezo packets, the required clamping force and consequently the necessary friction force for the movement of the driven part cannot be reached.

It is known already from U.S. Pat. No. 7,638,329 that, to this end, the clamping piezo packets arranged in a row are supported in each case via a so-called semi-rigid bridge on the reference part under pre-tension. In this arrangement, the driven part needs to be rigid. In connection with the "Semirigid" bridge, the term "semi-rigid" means that the bridge adapts at least in the longitudinal tolerance and the expansion stroke range of the clamping packets in the static state to stack height differences of the clamping piezo packets by elastic bending, but in the dynamic state remains essentially rigid with the operating frequency. This is based on the recognition that the movement of piezo packets is very small. The available expansion length of a piezo packet is about one thousandth of the stack height.

In the piezo-electric motor according to U.S. Pat. No. 7,638,929, the content of which is enclosed herewith by reference, it is proposed for an improvement of the principle of the "semi-rigid bridge" to provide it in the form of separate frictionally joined bridge elements which are assigned in each case to a clamping piezo packet. It is also provided that, by a selection of the geometry of the arrangement of the stepping piezo packets, specifically the positioning of the arrangement of the stepping piezo packets relative to each other in an opposite sense, an optimally adapted "transmission ratio" between the stepping piezo expansion of the leg movement at the connecting point of the legs to the driven part can be adjusted. In this way, with an appropriate operating frequency of the piezo packets in an application as a motor vehicle drive with direct transmission to the wheel shaft for example via a brake disc serving as a drive disc, speeds of over 200 km/hr can be achieved. In addition, a speed control can be achieved in a simple manner by a phase shifting of the control for the oppositely energized stepping piezo packets.

It is the object of the present invention to provide, based on the use of a piezo-electric motor of the type as known from U.S. Pat. No. 7,638,329, a complete drive arrangement for use for example as vehicle drive, wherein beyond the specific requirements for the piezo motor also the other conditions as they apply specifically during operation of a motor vehicle are taken into consideration.

As explained above with reference to the piezo motor of U.S. Pat. No. 7,638,329, it is important for the functioning thereof that the driven part and the clamping piezo packets are tightly pre-tensioned. During the stepping procedure of the legs of the clamping piezo packets for driving the disc serving as driven part, the machine clamping packet legs are raised from the driven part only minimally that is a few hundredths of a millimeter.

The piezo motor may not only be used as a motor for driving the drive disc but also for braking in that it is driven by the drive disc and in the process operates as an electric generator whereby it resists the rotation of the drive disc. For braking a motor vehicle however, it is necessary to provide additional friction brake pads for generating strong braking effects.

In hybrid drives of motor vehicles with a selectively activatable internal combustion engine and electric motor, it is, in connection with the use of a piezo motor as electric motor, also necessary that the piezo motor can be switched off the drive disc when the vehicle is to be operated by the internal combustion engine. This means that then the legs of the clamping piezo packet all need to be raised off the drive disc in contrast to the tight engagement required for active operation. A release switching arrangement performing this function has also been proposed in U.S. Pat. No. 7,638,329 discussed earlier. However, an improvement with respect to minimal fault sensitivity and unlimited operation would still be desirable.

The object of a further development of the piezo motor as a full drive is to provide all the necessary functions that are needed for example for a motor vehicle drive and have them integrated into a complete vehicle drive, which furthermore also can take over the function of braking.

A vehicle drive on the basis of a piezo motor is desirable in particular also because, in this way, an interesting alternative to the so far commonly used electric motor drives of motor vehicles, especially in the form of hybrid drives is offered. In the electric motor vehicle drives used so far characteristically, there is a need for the use of highly effective magnetic components of rare earth magnets for which the global resources are very limited and which, with heavy utilization in motor vehicle drives, are easily subject to corrosion. In addition, the large amount of necessary copper components of electric motors is problematic.

SUMMARY OF THE INVENTION

In a universal drive with a rotatable or linearly movable drive member and piezo actuators supported on a carrier for acting on a leg supported on the drive member and moving the leg in a high-frequency stepping sequence in a drive direction, wherein the carriers are joined and supported on a stator by a pretension member which biases them elastically toward the drive member via an elbow lever mechanism including a first elbow lever and at least a second elbow lever which are both connected to an actuator by a coupling member and this arrangement is such that, with the first elbow lever stretched, the second elbow lever is kinked and vice versa.

The invention comprises a special combination of a spring mechanism and an elbow lever mechanism to facilitate the pre-tensioning of the clamping piezo packets or other actuators with their legs against the drive disc and, the retraction for a release in a rapid and uncomplicated manner and also to make a fast and effective application of an additional friction brake possible.

As already mentioned in the introduction, the drive according to the invention is particularly based on piezo actuators. However, instead of actuators and clamping piezo packets and stepping piezo packets also other actuators may be used such as magnetic-inductive or magneto-restrictive actuators which can be operated at high frequency and have similar properties with regard to the generation of a high frequency sequence of steps of legs which are supported on a drive member.

Also, the drive member is not limited to a disc, in particular not to a rotating disc, but it may be any rotatable or linearly movable member such as a plate, a cylinder, a spindle or another component.

Although the universal drive according to the invention is particularly suitable as an automobile or vehicle drive including a hybrid drive, it may be used universally for example for driving industrial robots, machine tools or control or clamping arrangements. It may also be used as anti-magnetic drive in medical applications or as iron-free drive for example in spin tomographs.

The drive according to the invention may also be operated in a reversed manner that is as an electric generator. In this way, the use as a wind mill power generator or as an electric generator is conceivable. But in particular, its use as generator for recuperating braking energy in motor drives is possible.

The invention will become more readily apparent from the following description of a particular design and the operation of an exemplary embodiment with reference to the accompanying schematic drawings.

DESCRIPTION OF AN EXEMPLARY EMBODIMENT

Figure 1:
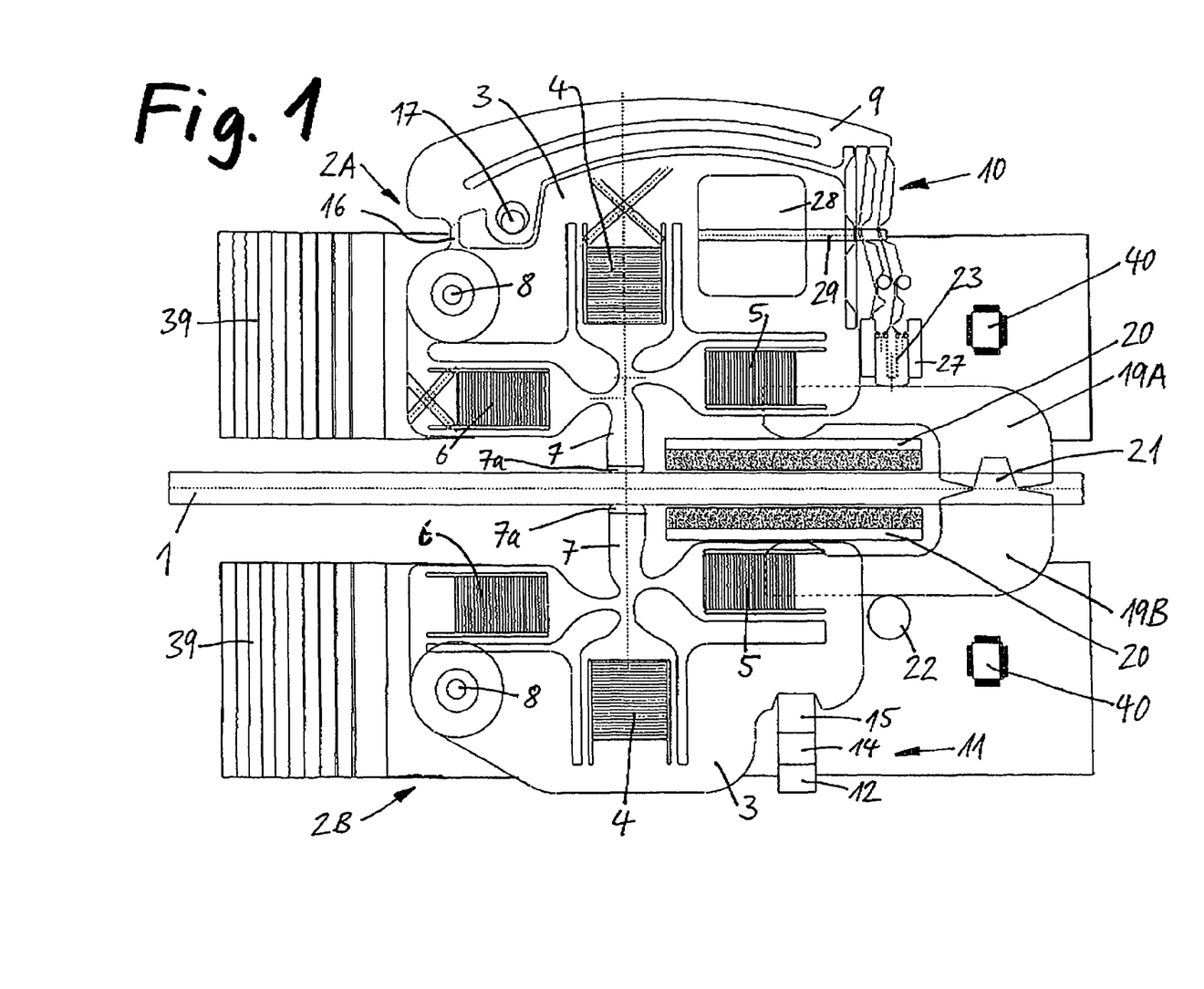
FIG. 1 shows in a sectional view, radially with respect to the drive disc, a piezo motor drive according to the invention.

FIG. 1 is a schematic representation of the piezo motor complete drive according to the invention as seen in a radial direction relative to the drive/brake disc.

A disc 1 serving as drive disc as well as brake disc of the piezo motor is mounted as usual on a wheel shaft. At its circumferential area, the disc is received in mirror-like manner between a piezo motor block 2A at one side of the disc and, in a mirror-reversed manner, a piezo motor block 2B at the other side of the disc 1.

Each of the piezo motor blocks is in its design essentially known from U.S. Pat. No. 7,638,329.

Each piezo motor block 2A/2B comprises several piezo packet sets which are arranged next to one another in the radial direction of the disc 1 and each of which includes a piezo packets carrier 3, adjacent clamping piezo packets 4 and two stepping piezo packets 5, 6. The clamping piezo packet 4 extends normal to the surface of the disc 1 and is supported at its end remote from the disc 1 on the piezo packets carrier 3. At its end facing the disc 1, it is connected to a leg 7 which is supported on the disc 1 and provided at its end facing the disc preferably with a hard metal layer 7a. The two stepping piezo packets 5, 6 are oriented toward each other in a mirror-reversed manner and extend parallel to the surface of the disc 1. They are also displaced with respect to each other in the longitudinal direction of the clamping piezo packet 4 by a certain distance and in engagement with the leg 7 in each case via a plunger and, at their opposite end, they are supported on the piezo packet carrier 3. The distance between the end of the leg 7 supported on the disc 1 and the stepping piezo packet 6 closer to the connecting point with the disc 1 is larger by a multiple than the distance between the connecting point of the two stepping piezo packets 5, 6 and between the connecting point with the stepping piezo packets 5 and the clamping piezo packet 4 in each case a quasi-joint that is an area of reduced thickness material which acts as a joint because of the elasticity of the material.

Deviating from the exemplary embodiment, in each piezo packet set also both stepping piezo packets may be arranged at the same side of the clamping piezo packets. Such an arrangement is compact, but, on the other hand, has the advantage that only small stroke transmissions at the leg 7 can be reached.

In each piezo motor block 2A, 2B, there are two groups of piezo packet sets which are energized alternately in the manner as known already from the piezo motor disclosed in U.S. Pat. No. 7,638,329 so that the legs 7 of, in each case, one group executes in contact with the disc 1 one stepping movement and the legs 7 of the other group are raised off the disc while moving back a step. The geometry of the arrangement makes a transmission of the stepping stroke of the stepping piezo packet 5, 6 possible so that the end of the leg 7 supported on the disc 1 executes a multiple size step movement.

For simplification and better understanding of the drawing the stator and also the piezo motor blocks and the housing including also other components are not shown in the figure. Shown are only the housing-connected elements on which the piezo motor blocks and further components are supported.

The piezo packet carrier 3 of all the piezo packet sets (which are arranged one behind the other normal to the drawing plane) are interconnected by a bolt 8 mounted to the housing. The piezo packet carriers 3 are arranged on this bolt 8 so as to be pivotable but are clamped to one another on the bolt 8 by a clamping mechanism which will be described below with reference to FIG. 3 of the drawings.

The pre-tensioning force for the clamping piezo packets of the two piezo motor blocks 2A, 2B for pressing the respective leg 7 onto the disc 1 is generated by a cantilever spring elbow lever mechanism arrangement which includes for each piezo packet carrier 3 a cantilever spring 9 and an elbow lever mechanism 10. This arrangement consisting of a cantilever spring 9 and an elbow lever mechanism 10 is effective directly only on the respective piezo packets carrier 3 of the one piezo motor block 2A while the other piezo motor block 2B is supported by a support arrangement 11 on a housing support part 12.

As apparent from FIG. 1, the geometry of the motor block arrangement is so selected that the legs 7 of each piezo motor block 2A/2B as well as the respective clamping piezo packet 4 is disposed about in the center of the piezo motor block, whereas the bolt 8 around which the piezo packet carrier 3 is pivotable is displaced therefrom in the circumferential direction of the disc 1 by a substantial distance. The leg 7 is pressed onto the disc 1 or, respectively, lifted off the disc 1 consequently by pivoting of the respective piezo packet carrier 3 around the bolt 8 (even though only very slightly).

The piezo packet carrier 3 of the piezo motor block 2B is supported by the support arrangement 11 on the housing based support part 12 at a location which is spaced from the legs 7 in a direction opposite with respect to the bolts 8 again by a substantial distance.

Figure 2:
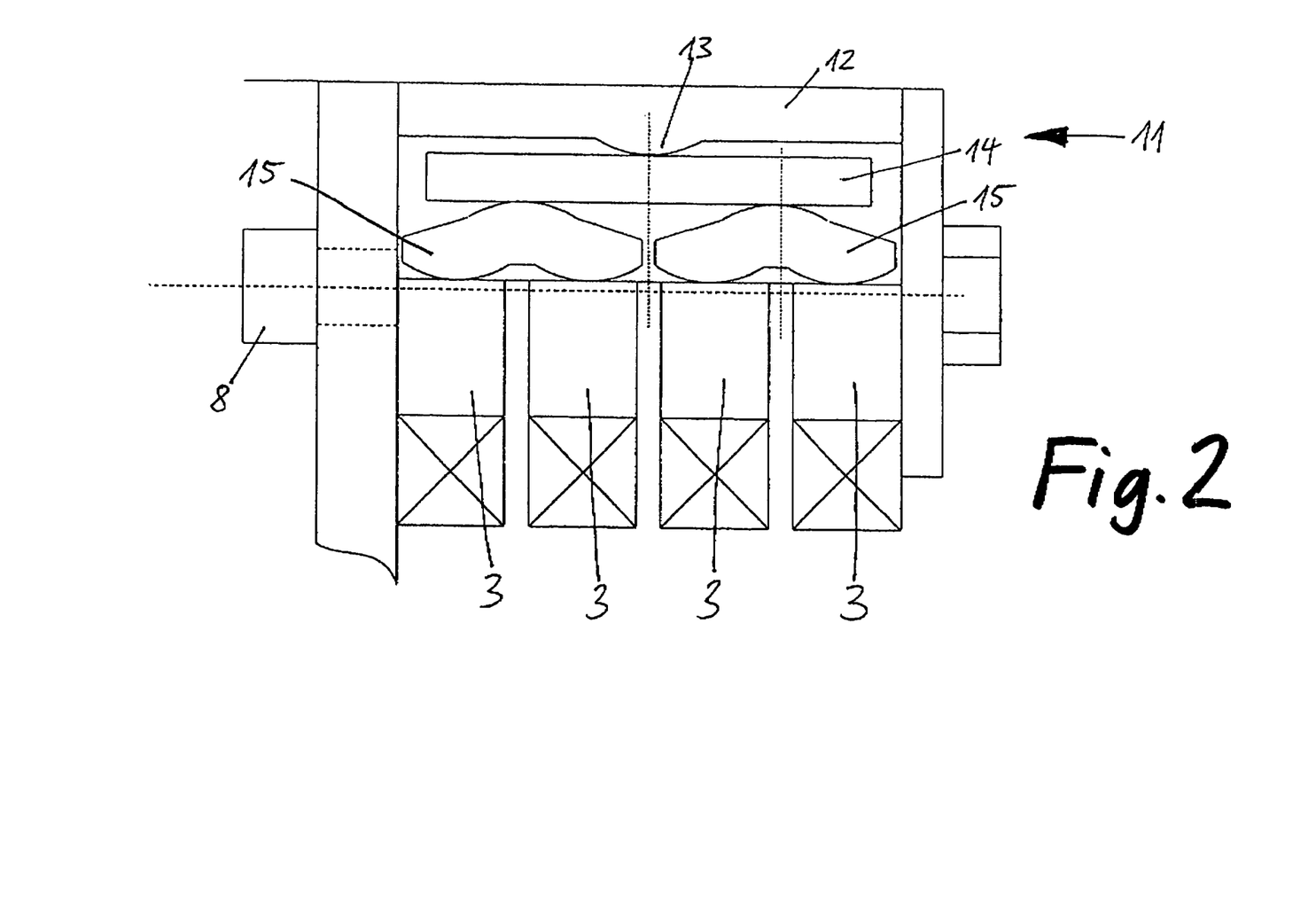
FIG. 2 is an enlarged detail view in the direction of the arrow 11 of FIG. 1.

The support arrangement is shown in FIG. 2 in an enlarged schematic representation. The four piezo packet sets with the respective piezo packet carriers 3 which are arranged there in radial direction of the disc 1 that is normal to the drawing plane of FIG. 1, are shown in FIG. 2. In the background also the bolt 8 is visible. The support arrangement 11 supports the four piezo packet carrier 3 on the housing based support part 12 in such a way that a tolerance compensation for possible tolerance-caused differences of the expansion of the piezo packet sets normal to the disc is facilitated. To this end, a pivot plate 14 is supported on the housing-based support part 12, specifically on a centered arched projection 13, on which again two pivot bodies 15 are supported on which then in each case two adjacent ones of the four piezo packet carriers 3 are supported.

The cantilever spring pivot lever mechanism arrangement is effective on the piezo motor block 2A and makes the switchable engagement or release with respect to the disc 1 and also relative to the other motor block 2B possible so that, as a result of the support of the other piezo motor block 2B on the housing, a pressing of the piezo motor block 2A onto, or the release therefrom the disc 1, results in a pressing or respectively release also of the other piezo motor block 2B with respect to the disc 1 extending therebetween.

The cantilever spring arrangement consists in each case of a cantilever spring 9 assigned to each piezo packet carrier 3 which spring 9 is connected to the piezo packet carrier 3 by a web 16 extending about normal to the disc 1. The web 16 is geometrically so shaped that on one hand, it can serve as a support for the cantilever spring 9 but also forms a quasi pivot joint for permitting a small pivot movement of the cantilever spring 9 about the web 16 in a direction toward the disc 1 and away therefrom.

At a certain distance from the location of the bolt 8 in a direction toward the leg 7 of the respective piezo packet carrier 3 an eccentric connected to the housing is arranged which acts on the respective cantilever spring 9 in order to pretension the spring in a direction toward the disc 1. With the pretension stored in the cantilever spring 9, the spring then presses via the elbow lever mechanism 10 the respective piezo packet carrier 3 toward the disc 1.

Deviating from the exemplary embodiment, the cantilever spring 9 may be fixed at the end thereof remote from the elbow lever mechanism. Instead of a pretension by an eccentric, also a hydraulic or other pressure cylinder may be used as pretension source. It can even be possible to replace the cantilever spring by another pre-tensioning source.

Figure 4:
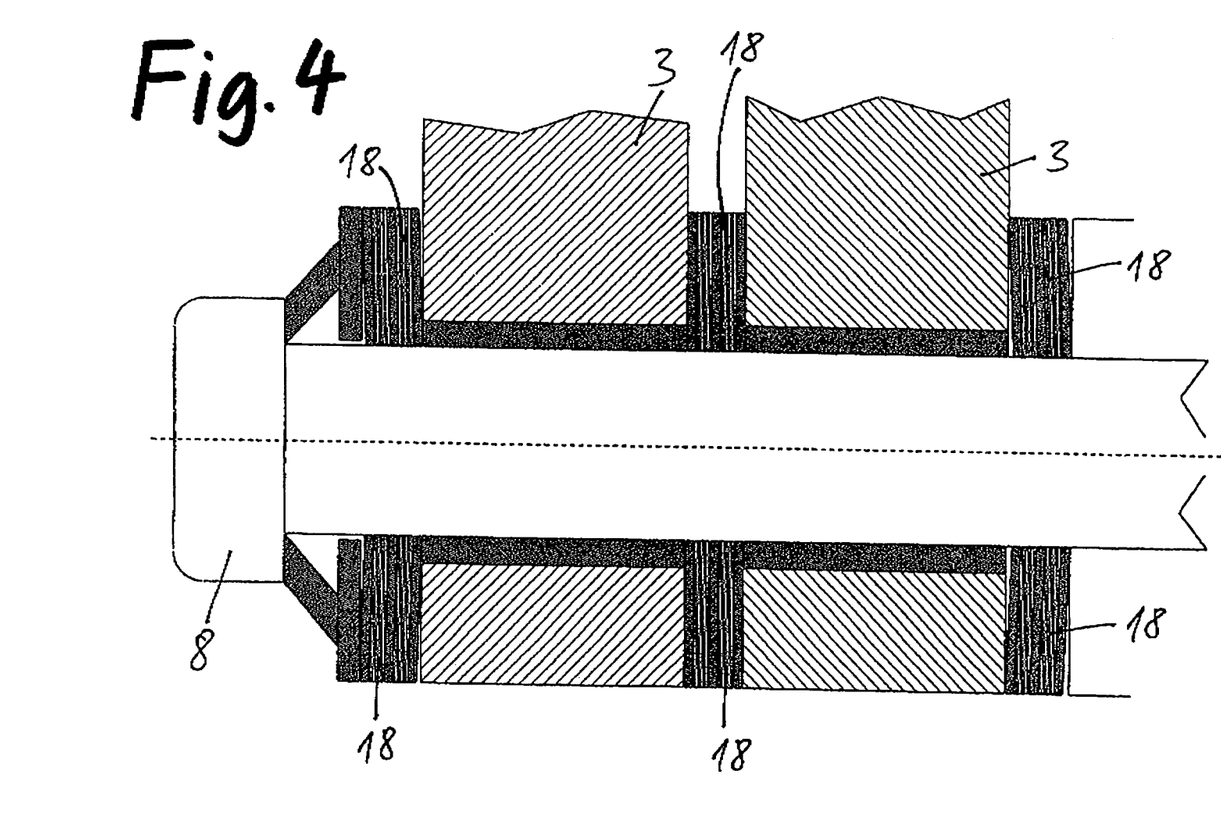
FIG. 4 is a cross-sectional view in the direction of the arrow IV in FIG. 1 of a clamping mechanism for a piezo packet group carrier.

FIG. 4 shows in an enlarged cross-sectional view the tensioning mechanism of the reciprocal tensioning of the piezo packet carriers 3 of a piezo motor block which are arranged, side-by-side, on the bolt 8. Whereas, in the state of the art as described in the introductory part in accordance with U.S. Pat. No. 7,638,329 fixed reciprocal tensioning of the piezo packet carrier and consequently a fixed characteristic of the so-called "semi-rigid bridge" (which is formed hereby) is provided, in the arrangement according to the present invention, the reciprocal tensioning of the piezo packet carrier 3 on the bolts 8 is controllable. For clarity reasons, only tow of the four piezo packet carriers 3 which are arranged next to one another are shown in the enlarged cross-sectional view of FIG. 4. Between the adjacent piezo packet carriers 3 and also the housing based stops at the axial ends, annular plate-shaped piezo elements 18 are disposed like plate springs. They consist in each case of a piezo layer disposed on a steel disc and have friction pads at their sides facing the piezo carriers. Depending on the electrical control or energization of these piezo elements 18, they change their configuration between a planar and a slightly conical configuration whereby the pre-tension is changed. These piezo elements 18 form therefore a kind of controllable plate springs.

All the piezo packets (not shown) include force sensors whose signals are supplied to an electronic control unit which controls the piezo elements 18 for optimally controlling the pretension of the piezo packet carrier 3 in connection with the piezo forces in an optimal way.

The piezo motor complete drive according to FIG. 1 furthermore includes a disc brake with a brake caliper 19A, 19B and brake pads 20 arranged at opposite sides of the disc 1. The brake caliper comprises caliper arms 19A and 19B which are joined via a pivot joint 21.

Figure 3:
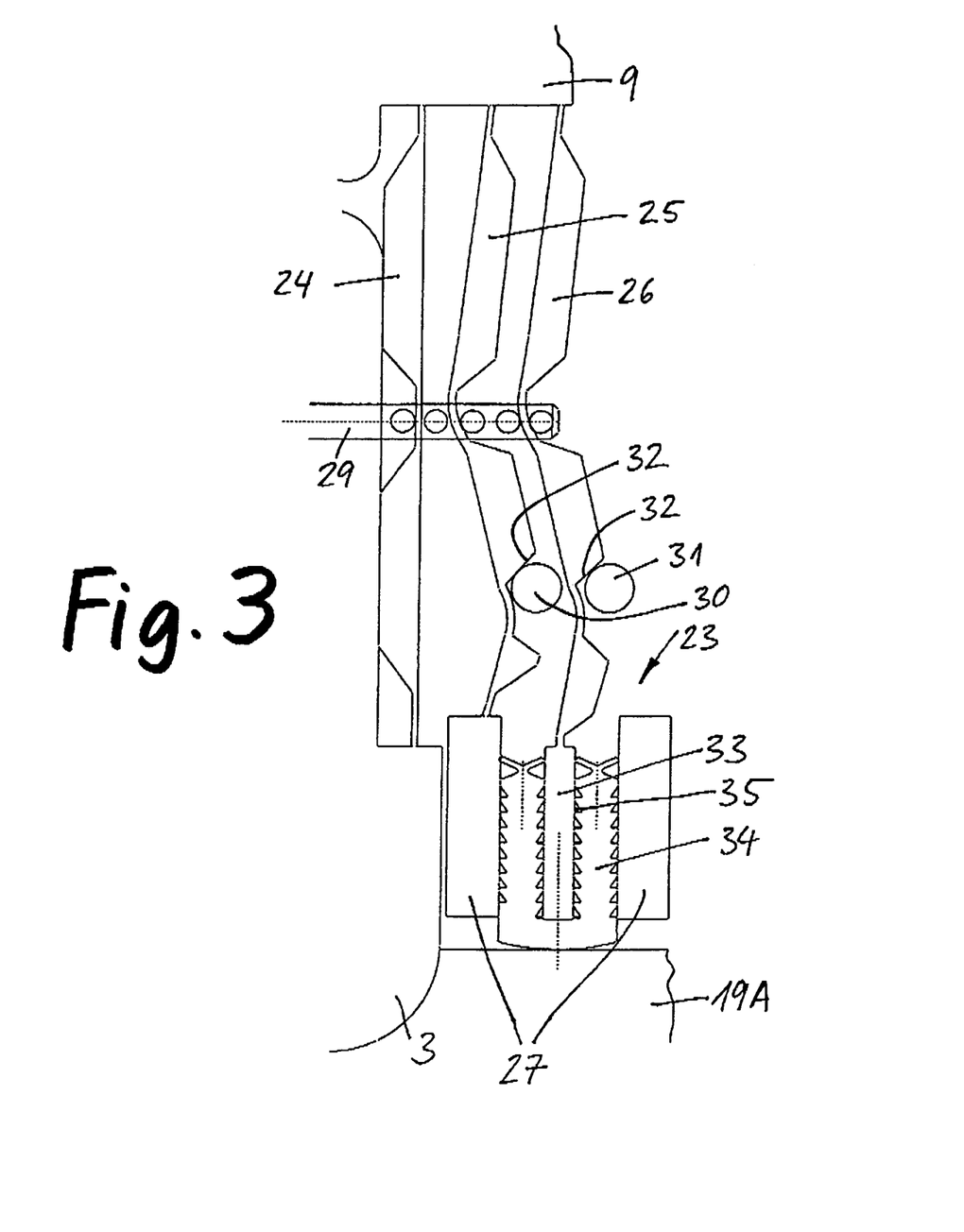
FIG. 3 is an enlarged representation of the elbow lever mechanism of the arrangement shown in FIG. 1.

The brake arm 19B is supported on a housing-based support structure 22 whereas a plunger 23 operable by the elbow lever mechanism 10 acts on the brake arm 19A. It is to be understood that the brake arms 19A/19B are biased to their release position which however is not specifically shown. Now the elbow lever mechanism 10 will be described in greater detail with reference to FIG. 3. It has three objects, that is:

1. the transmission of the pretension of the cantilever spring arrangement to the piezo motor blocks 2A/2B,
2. the release of the piezo motors from the disc 1, and
3. the actuation of the plunger 23 effective on the brake pads.

The elbow lever mechanism comprises a first elbow lever 24, a second elbow lever 25 and a third elbow lever 26.

The first elbow lever 24 is supported at one end on the cantilever spring 9 and acts with its other end on the respective piezo packet carrier 3. The second elbow lever 25 is arranged between the cantilever spring 9 and a housing-based counter support 27. The third elbow lever 26 is arranged between the cantilever spring 9 and the plunger 23.

For operating the elbow lever mechanism 10 an actuator (see FIG. 1) is provided which is connected to the elbow joints of all three elbow levers 24, 25, 26 by a coupling member 29 so that in each case all three elbow levers are actuated at the same time.

The arrangement is such that, when the piezo motor is in operation also the piezo packet carrier 3 need to be pretensioned toward the disc 1, the first elbow lever is stretched, whereas, at the same time the second elbow lever 25 and the third elbow lever 26 are kinked. Also, because of the coupling of the elbow lever joints and when the first lever 24 is kinked, the second and the third elbow lever 25, 26 are stretched.

For the release, the actuator 28 moves the coupling member 29 in FIG. 3 toward the right so that the first elbow lever 24 is kinked and, at the same time, the second and the third elbow levers are stretched. As is shown in FIG. 3, the second and third elbow lever 25, 26 comprise each three parts and have in each case a second elbow joint which in each case abuts a housing-based stop 30 and 31, respectively. These three-part configurations of the second and third elbow joints 25, 26 increases the stretching with a small bending of the respective first elbow joint connected to the coupling member 29.

The geometry of the second and the third elbow lever 25/26 is so selected that the third elbow joint 26 is lengthened to a greater extent during stretching than the second elbow joint 25.

When therefore the actuator 28 moves the coupling member 29 in FIG. 3 to the right, the first elbow lever 24 is kinked and, at the same time, the second and third elbow levers 25 and 26 are stretched. With the stretching of the second elbow lever 25 which is supported on a housing based support 27, the piezo packet carrier 3 is pivoted away from the disc so that the leg 7 is raised from the disc 1 and consequently the piezo motor is freed. Upon further movement of the coupling member to the right (FIG. 2), the third elbow lever 26 is stretched to the extent that, because of its increased lengthening over that of the second elbow lever 25, moves the plunger 23 toward the disc 1 and therefore operates the brake arm 19A directly and, indirectly the brake arm 19B.

As also apparent from FIG. 3, in the second and the third elbow lever 25, 26 the elbow lever member extending in each case between the two elbow joints includes an inclined surface area 32 which cooperates with the respective housing-based stop 30, or respectively, 31 and which cooperates with the housing based stop 30, 31 in the way of a wedge drive for accelerating and supporting the stretching.

Since for operating the elbow lever mechanism 10 only a minimal travel length is required and an elbow lever stretching always coincides with the kinking of another elbow lever, also the operating force is in each case small so that a high frequency stutter braking operation becomes possible which has not been known earlier.

In order to compensate for wear of the brake pads of the brake arms 20, the plunger 23 comprises a plunger neck 33 which is connected to the third elbow lever 26, and a plunger body 34 which cooperate via locking members 35, so that the plunger body 34 is movable only in the direction toward the brake arm 19A relative to the plunger neck in a stepwise fashion.

Figure 5:
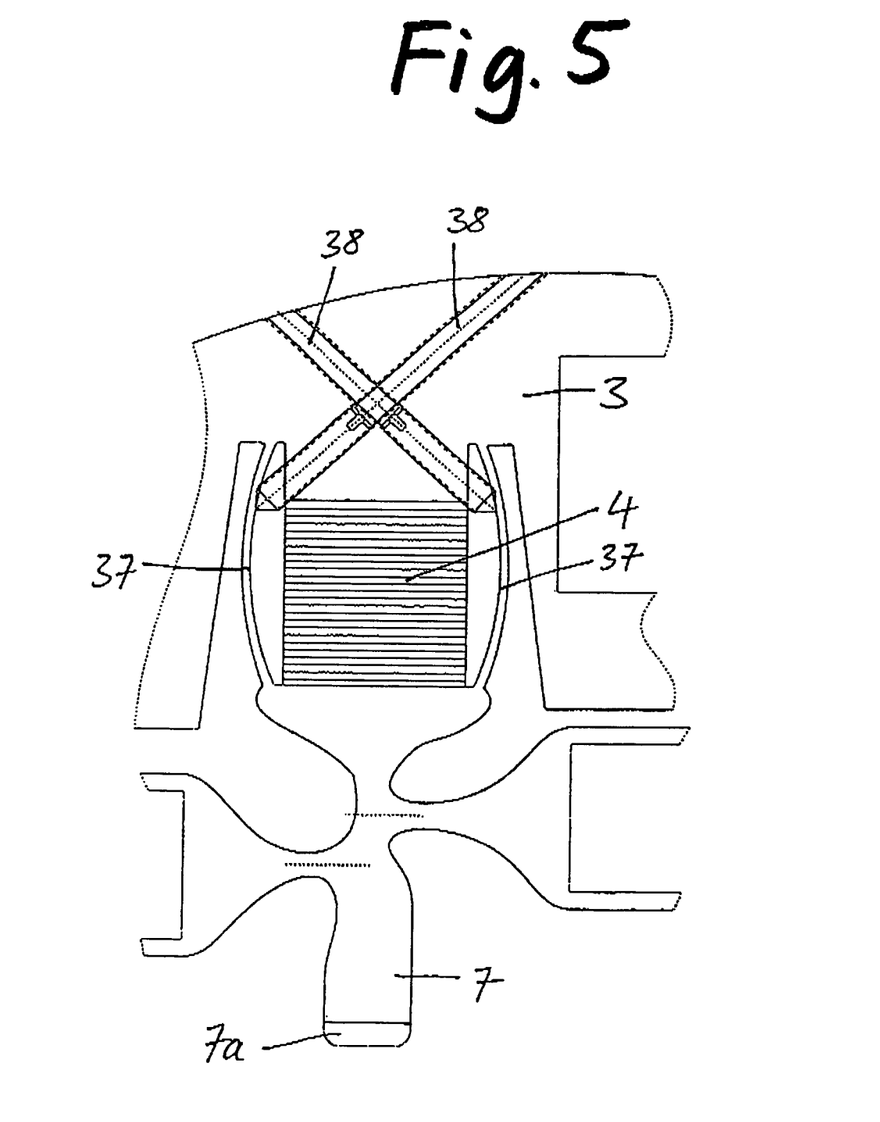
FIG. 5 is an enlarged detail view of an arrangement for the adjustment of the piezo packet setting.

Since the piezo packets can by highly pressure loaded but are sensitive to tensile stresses each piezo packet is placed under compression pre-pressure by leaf spring-like arms 37 which are arranged at opposite sides of the respective piezo packets and act as tension springs. This is shown in FIG. 5. With the aid of pressure bolts 38 or other similar elements, the arms 37 can be adjustably bent outwardly as shown in FIG. 5 for an adjustment of the pre-compression pressure as well as the spring characteristics.

Finally, FIG. 1 also shows that at the piezo motor cooling metal sheets are arranged at one side and extend in circumferential direction. They are corrugated for improving the cooling effect and increasing the cooling surface or they may also be accordion-like folded and at the other side of the piezo motor further cooling metal sheets are provided which also extend in circumferential direction of the disc 1 and serve as carriers for the control electronics.

What is claimed is:

1. An electric universal drive comprising:

A revolving or linearly movable drive member (1) having at least two sets of actuators each arranged in its own carrier (3) in particular piezo actuators (4, 5, 6) each acting on a leg (7) supported on the drive member (1), the at least two sets of actuators alternately pressing the respective associated leg (7) onto the drive member (1) for engagement therewith and displacing it in a direction of the desired movement of the drive member in a high-frequency stepping sequence, the carrier (3) of the actuator sets being connected in a semi-rigid manner with respect to the leg (7) parallel to the movement direction of the drive member at a location which is displaced to one side and the carrier (3) being supported on a stator and pre-tensioned elastically by a pretension member (9) and an elbow lever mechanism (10) arranged between the pretension member (9) and the respective carrier (3) for transferring the pretension force, the elbow lever mechanism (10) including a first elbow lever (24) which engages the carrier (3) at a point which is displaced with respect to the leg (7) parallel to the direction of movement of the drive member (1) toward the, with respect to the carrier connection point, other side, the elbow lever mechanism having a second elbow lever which is arranged between the pre-tensioning member (9) and a stator-based support (27), and an operating actuator (28) which is associated with the elbow operating mechanism (10) and which is connected to the elbow joints of two of the elbow levers (24, 25), and the arrangement of the elbow lever (24) mechanisms (10) being so selected that, when the first elbow lever is stretched, the second elbow lever (25) is kinked and vice versa, and the actuator (28) for the common switching of the two elbow levers (24, 25) being provided for the switching of the elbow lever (24, 25) between the stretched position and the kinked position.

2. The universal drive as claimed in claim 1, wherein the drive includes a friction brake with brake arms (19A, 19B) including brake pads (20) to be pressed into engagement with the drive disc (1), the elbow lever mechanism (10) including a third elbow lever (26) which is arranged between the pre-tensioning member (9) and the brake arm (19A) and whose elbow joint is also supplied to the coupling member (29), the arrangement being so selected that, when the first elbow arm (24) is stretched, the third elbow arm is kinked and vice versa, and the geometry of the second elbow lever (25) and of the third elbow lever (26) being so selected that the third elbow lever (26), during movement to the stretched position, is extended to a greater degree than that of the second elbow lever (25).

3. The universal drive as claimed in claim 2, wherein the pre-tensioning member is formed by a cantilever spring arrangement with a cantilever spring (9) for each carrier (3) which spring (9) is firmly supported in the area of the mutual connection of the carriers (3) fixed to the housing and which is pre-tensioned and extends to the elbow lever mechanism (10).

4. The universal drive as claimed in claim 3, wherein the cantilever spring (9) at its end remote from the elbow lever mechanism (10) is connected, in the area of the mutual connection of the carrier, to the respective carrier, at the area thereof opposite the drive member (1).

5. The universal drive as claimed in claim 3, wherein the cantilever spring (9) is placed under pretension by means of an eccentric (17) in the direction toward the drive member (1) at a location parallel to the movement direction of the drive member (1) between the connecting point to the carrier or the housing and the leg (7).

6. The universal drive as claimed in claim 1, wherein the second elbow lever (25) comprises three sections and has a second elbow joint supported on a housing support (30).

7. The universal drive as claimed in claim 2, wherein the third elbow lever (26) has three sections and includes a second elbow joint supported on a stationary housing support (31).

8. The universal drive as claimed in claim 6, wherein between the elbow joint connected to the coupling member (29) and the second elbow joint of at least one of the second elbow lever (25) and the third elbow lever (26) has an inclined surface area (32) cooperating with the associated housing support (30, 31) like a wedge drive.

9. The universal drive as claimed in claim 2, wherein the plunger (23) comprises, for the adjustment for brake pad wear, on the brake arm (19A, 20) a plunger neck (33) and a plunger body (24) which cooperate via stop notches (35) so that the plunger body is movable stepwise only in the direction toward the brake arm and pad (19A, 20) relative to the plunger neck (33).

10. The universal drive as claimed in claim 1, wherein the leg (7) of each actuator set is provided with a hard metal element (36) at its end which cooperates with the drive member (1).

11. The universal drive as claimed in claim 1, wherein the carriers (3) are supported all by a housing-mounted bolt (8) on which they are pivotable in the direction toward the drive member and the carriers are engaged by washer-like piezo elements (18) which are frictionally fixed on the bolt (8) in a controllable manner.

12. The universal drive as claimed in claim 1, wherein the actuators (4, 56) are piezo actuators and are each provided with a force sensor and the piezo elements (18) controlling the engagement force of the carrier are controlled by an electronic control unit evaluating the signals of the force sensors of the piezo actuators.

13. The universal drive as claimed in claim 1, wherein the drive member (1) is disc or plate-shaped and at least two actuator sets are arranged in a mirror reversed manner at each side of the drive member and wherein only the actuator set at one side of the drive member (1) is pre-tensioned and the actuator set arrangement disposed at the other side of the drive member (1) is rigidly supported on the housing.

14. The universal drive as claimed in claim 13, wherein the two brake arms (19A, 19B) are arranged at opposite sides of the drive member (1) in mirror-reversed manner and are coupled wherein only the brake arm (19A, 20) at one side of the drive member (1) is engageable by a plunger (23) via the elbow lever mechanism (10) while the brake arm (19B, 20) at the other side of the drive member is supported by a fixed housing support.

15. The universal drive as claimed in claim 1, wherein the actuators in the form of piezo actuators are compression tensioned by leaf spring-like arms (37) of the carrier (3) arranged at opposite sides of the piezo actuators and forming tension springs and the arms (37) are adjustable by pressure screws (38) or similar elements so as to be curved for an adjustment of the pretension force and the spring characteristic.

* * * * *